US008807425B2

(12) United States Patent
Saywa et al.

(10) Patent No.: US 8,807,425 B2
(45) Date of Patent: Aug. 19, 2014

(54) SYSTEM, PROCESS AND COMPUTER WRITEABLE MEDIUM INCORPORATING ANY OF STANDARD OR ADHESIVE ATTACHABLE TAGS INCORPORATING A UNIQUE IDENTIFIABLE NUMBER OR ALTERNATELY A DIGITALLY DOWNLOADABLE TAG AND APPLICATION HAVING GPS LOCATING ABILITIES AND WHICH ARE COMBINED WITH A WEBSITE OR MOBILE APPLICATION FOR REGISTERING AND ASSISTING IN RETRIEVAL OF TAGGED VALUABLES OR ASSETS

(71) Applicants: Alvin C. Saywa, Las Vegas, NV (US); Luis Villalobos, Jr., Hialeah, FL (US); Vincent Yaldo, Rochester, MI (US); Daniel Isho, Oakland Township, MI (US)

(72) Inventors: Alvin C. Saywa, Las Vegas, NV (US); Luis Villalobos, Jr., Hialeah, FL (US); Vincent Yaldo, Rochester, MI (US); Daniel Isho, Oakland Township, MI (US)

( * ) Notice: Subject to any disclaimer, the term of this patent is extended or adjusted under 35 U.S.C. 154(b) by 0 days.

(21) Appl. No.: 13/871,559

(22) Filed: Apr. 26, 2013

(65) Prior Publication Data
US 2013/0284804 A1 Oct. 31, 2013

Related U.S. Application Data

(60) Provisional application No. 61/639,519, filed on Apr. 27, 2012.

(51) Int. Cl.
*G06K 5/00* (2006.01)
*G06K 19/06* (2006.01)
*G06Q 10/08* (2012.01)
*G06F 17/30* (2006.01)
*G06Q 50/10* (2012.01)

(52) U.S. Cl.
CPC .......... *G06F 17/30* (2013.01); *G06K 19/06037* (2013.01); *G06Q 10/087* (2013.01); *G06Q 50/10* (2013.01)
USPC ............................ 235/380; 235/494; 235/487

(58) Field of Classification Search
USPC ............... 235/380, 487, 375, 488, 494, 462.1
See application file for complete search history.

(56) References Cited

U.S. PATENT DOCUMENTS 6,212,504 B1 4/2001 Hayosh
6,533,172 B1 3/2003 Popp (Continued)

OTHER PUBLICATIONS

Dynotag.; 8 pages, on sale through Amazon.com, first commerical publication approximately Jan. 2012.

(Continued)

*Primary Examiner* — Edwyn Labaze
(74) *Attorney, Agent, or Firm* — Gifford, Krass, Sprinkle, Anderson & Citkowski, P.C.

(57) ABSTRACT

A portable asset tagging system, process and computer writeable medium including at least one tag exhibiting a QR code along with a separate unique identification number printed thereon, the tag also identifying a site address accessibly by a member user and associated with the system. A software program is incorporated into a processor integrated device used to access the site address and exhibiting a visual display and includes user enterable fields for creating a member profile and for identifying and pairing the asset to the tag in order to establish ownership with information derived from the member profile. Upon the item being lost and subsequently found, the finder entering the unique identification number or scanning the QR code in order to uncover at least one additional data field which draws information from the member entered fields in order to facilitate return of the lost item.

19 Claims, 11 Drawing Sheets

(56) References Cited

U.S. PATENT DOCUMENTS

| | | |
|---|---|---|
| 7,283,047 B2 | 10/2007 | Culpepper et al. |
| 7,538,681 B1 | 5/2009 | Sharma et al. |
| 7,628,336 B2 | 12/2009 | Reynolds et al. |
| 7,855,643 B2 | 12/2010 | Tuttle |
| 2005/0145688 A1 | 7/2005 | Milenkovic et al. |
| 2007/0033108 A1* | 2/2007 | Luhr ................................ 705/22 |
| 2009/0134218 A1* | 5/2009 | Yuzon et al. ................... 235/382 |
| 2010/0258618 A1 | 10/2010 | Philbrick et al. |
| 2011/0010971 A1* | 1/2011 | Erickson et al. ................. 40/300 |
| 2012/0191855 A1* | 7/2012 | Alexander ..................... 709/225 |
| 2012/0234907 A1 | 9/2012 | Clark et al. |
| 2012/0267430 A1 | 10/2012 | Penny et al. |
| 2012/0305644 A1* | 12/2012 | Daniels, Jr. ................... 235/380 |
| 2013/0173484 A1* | 7/2013 | Wesby .......................... 705/318 |

OTHER PUBLICATIONS

Dynotag launches industry first internet-enabled QR Code Consumer Product Line, PR Web online visibility from Vocus; 3 pages, http://www.prweb.com/releases Jan. 18, 2012.

Luggage Tracking Made Easy, htt[://www.supersmarttag.com/custom.cfm?ID=01BBAIDD, 7 pages, Worldwide No. 1 Lost Luggage Prevention Product—Travel Smartl, Apr. 10, 2013.

Dynotag Internet/GPS Enabled QR Code Smart Medican and Emergency Contact Information Card Kit—2 cards, 5 pages, http://www.amazon.com/dynotag-internet-Enabled-Emergency-Inform . . . Mar. 5, 2013.

KillerStartups, TurlyTag.com-Recover your items if they get lost, turlytag.com http://www.killerstartups.com/web-app-tools/turlytag-com-recover-you . . Mar. 5, 2013, 8 pages.

\* cited by examiner

FIG. 8

| | | WELCOME BACK, | |
|---|---|---|---|
| Missing Link ...linking you to what's yours™ | | 🏠 Administration Profile | LOGOUT |

HOME | HOW IT WORKS? | E-STORE | ABOUT US | CONTACT US | FOLLOW US ON: | Social Network 1 | Social Network 2 | Social Network 3

144

ADMINISTRATOR PROFILE

| CONTACT INFORMATION | SOCIAL MEDIA |
|---|---|
| Click to edit any information field | Click to link your profiles: |
| Name * [Full name] | Social Networks 1 2 3 4 |
| Email * [Email Address] | |
| Phone * [Phone Number] 140 | 147 |
| Birthdate [Month▼] [Day▼] [Year▼] * | |
| Gender [Select▼] * | |
| Address | |

*Marks Mandatory Field. To Register a New UID#, All Mandatory Fields Must Be Completed. [SAVE]

EDIT PICTURE
CHANGE PASSWORD
MEMBER SINCE:
Month 2013
Registered City: City, State
142

UID#'s CURRENTLY ACTIVE

+ REGISTER NEW UID#

| OBJECT LINKED | UID# |
|---|---|
| Edit | Description | A1b2C3d |
| | | |
| | | |
| | | |
| | | |

Click on object to edit settings
Sponsored by:

SYSTEM, PROCESS AND COMPUTER WRITEABLE MEDIUM INCORPORATING ANY OF STANDARD OR ADHESIVE ATTACHABLE TAGS INCORPORATING A UNIQUE IDENTIFIABLE NUMBER OR ALTERNATELY A DIGITALLY DOWNLOADABLE TAG AND APPLICATION HAVING GPS LOCATING ABILITIES AND WHICH ARE COMBINED WITH A WEBSITE OR MOBILE APPLICATION FOR REGISTERING AND ASSISTING IN RETRIEVAL OF TAGGED VALUABLES OR ASSETS

CROSS-REFERENCE TO RELATED APPLICATIONS

This Application claims the benefit of U.S. Provisional Application 61/639,519 filed on Apr. 27, 2012, the contents of which are incorporated herein by reference in its entirety.

FIELD OF THE INVENTION

The present invention is generally concerned with the ability to tag and record valuables and assets, such as in order to facilitate recovery in the event of theft or loss. More specifically, the present invention discloses a system, process and computer writeable medium utilizing a variety of different tags, including physical clip, loop or adhesive attachable versions, as well as a digitally downloadable version of tag. The tags interface, such as by any combination of website or mobile application searchable unique identification number for accessing asset ownership information. The system can also include such features as RFID (radio frequency identification) and/or GPS technology in order to assist in tracking or locating of tagged assets. The associated website (or downloadable mobile application) provides additional functionality for assisting in recovery of assets including GO TO information and the like.

Additional applications include co-branded tags, in one case contemplating a luggage tag variant which can include a commercial air carrier's branding along with that of the system provider. Other applications can include for insurance cards (auto, health, etc.).

A further application contemplates incorporating the features of the present invention, such as notably including an unregistered combination of UID# and QR code, into a hotel card key along with a reader strip used with a hotel room electronic door, the key further exhibiting an edge proximate slot punch. The card can again exhibit co-branding (both hotel and system provider) and, following termination of its initial use as a door key (i.e. upon the bearer checking out of the hotel) the card is retained as opposed to being thrown away. At this point, the UID# and QR codes are activated as described in the present application and the key card subsequently re-employed as a luggage tag, such as by attaching the former key card to a lanyard through the slot punch.

BACKGROUND OF THE INVENTION

The prior art is documented with examples of systems and methods for facilitating the retrieval of lost, stolen or otherwise missing portable assets. A first example of such a system is depicted in US 2012/0267430, to Penny et al., and which provides for a bar-code or similar coding to be generated and tagged to a specific portable asset including such electronic devices as smart phones and laptop computers as well as various items of luggage including briefcases, purses, backpacks or the like. A tag on the portable asset visually displays the barcodes such that, in the event the property is lost, a finder of the property can snap a picture of the barcode using a smart device and be automatically directed to a web page containing information that facilitates the return of the portable asset. When tagging the portable asset, an owner thereof can control privacy levels with respect to information that ultimately becomes accessible to a subsequent finder of the asset.

Another variation of the lost property recovery system is depicted in the Dynotag commercial disclosure which discloses Internet-enabled smart tags attachable to items of personal property. A series of tags are provided, each of which depicting a unique QR Code and a corresponding unique short web address corresponding to a private mini web site and which interfaces with a cloud hosted private information page linked to the particular tag.

Dynotag further discloses a numeric activation pin number for registering a luggage tag or the like, however which is not utilized at any point thereafter as a search tool for assisting a finder in locating an owner of the lost asset. Dynotag further discloses accessing the owner's profile only by either scanning the QR code or typing in the indicate URL address.

Super Smart Tag teaches a further related luggage tracking product and system in tag form which is secured to each item of luggage and includes a user registration protocol in which the tag identification code and e-mail address is entered into a website. Updating contact information, travel itinerary or reporting a tag is also enabled by keying in the unique identification code.

SUMMARY OF THE INVENTION

The present invention discloses a portable asset tagging system, process and computer writeable medium which improves upon the feature and functionality of the Penny system, in that it pre-provides the QR codes with matching unique identification number for on the spot registration by a user, and rather than requiring the user to first set up an account before either downloading the QR code as a printable file or requiring that the QR code be mailed to the user/portable asset owner as is required in Penny. The invention is also an improvement over the Dynotag disclosure in that it provides a unique alpha-numeric number paired to a QR code imprinted upon the tag, either of which can be utilized in order to access an encrypted profile page, this in contrast to Dynotag in which 'Activation Pin' is only used to initially register the tag and then has no use after that. Our UID# serves those that do not use QR Codes so that they can go directly to MissingLink.com and look up the owner's profile.

Also, with Dynotag's product, the owner's "profile" can only be accessed by scanning the QR Code or by entering the URL that is below the QR Code (i.e. https://dynotag.com/LTD/ABB). This is in contrast to the present system in which profiles can only be accessed by searching the UID# on the system provider site or by scanning the QR Code. In this manner, an unauthorized user is prevented from accessing the profile page by typing in the URL, as it is purposely encrypted so that each URL reads something like this: http://www.missinglink.com/index.php?page id=uid_details. This encryption scheme is not overcome even if a user were to copy and paste the link into a web browser, as it will not take you to the encrypted profile page. Additionally, none of the profiles integrated into the softward component of the present system, method and computer writeable medium can be searched/accessed from a search engine.

The above said, the asset registering and tracking system of the present invention includes any plurality of tags physically attached to or digitally encoded in association with a physical item. At least one of the tags exhibiting at least one of a QR code or bar code, along with a separate unique identification number printed thereon, the tag also identifying a site address accessibly by a member user and associated with the system.

A software program incorporated into a processor integrated device used to access the site address and exhibiting a visual display. The program including a first plurality of secure user enterable fields for creating a member profile as well as identification information associated with the physical item paired to a selected tag associated with a record populated to that profile. The program further including additional field for member entry of information associated with the tag in order to establish ownership with information derived from the member profile. Upon the item being lost and subsequently found, the finder entering the unique identification number or scanning the QR/bar code in order to uncover at least one additional data field which draws information from said member entered fields in order to facilitate return of the lost item.

The tags can further exhibit a thin and rectangular shaped body exhibiting an edge proximate slot shaped aperture, an owner signature field being exhibited on a reverse side of said body. Alternately, a tacky/adhesive attachable tag can be provided, such as for affixing directly to a smart phone or laptop. Any plurality of digitally encoded tags can also be provided and which are displayed upon any of a website/application home, password or security screen.

Other features include a GPS function associated with the processor integrated device being activated concurrent with accessing the program. The software program may include any of a browser supported website or a mobile operating system supported application.

A computer writeable medium is also disclosed for use with a plurality of physical tags and a processor integrated device exhibiting a visual display for registering, tracking and identifying a physical item. A software program presents a plurality of secure user enterable fields in a first subroutine for creating a member profile.

A second subroutine provides for registering the physical item by entering a unique identification number listed on a selected physical tag which is attached to the item, the second subroutine further pairing the item to at least one of a QR code or bar code also listed on the tag. A third subroutine enables a finder of the item to access authorized data fields drawn from the first and second subroutines, such as by either entering the unique identification number or scanning the QR/bar code, and in order to facilitate return of the lost item to its owner.

Additional features associated with the software program include a home page which depicts a tag activation field, a login field, and a manual search field for the unique identification number. The home page may also depict a rotating center panel display exhibiting different images and descriptions such as which scroll through either of participating or target industries.

Additional features include an explanatory screen display including additional information relevant to a system or protocol associated with the program. An explanatory screen describes features and benefits of an item tracking, identification and recovery system associated with the program. Other features include a Contact Us screen for permitting a user to request additional information or provide comments, an administrator profile screen permitting registered users to initially enter all of their contact information a single time and which is then populated with all of previously and future entered tagged items, as well as to interface with social media entry fields and which provides for direct links with a users unique identification number assigned item page.

A command and control screen manages all of various tagged items including providing members with the option of picking and choosing contact information shown on each page, such as by checking ON/OFF for each field, the pages being individually customized to show only the desired information for that individual unique identification number. The third subroutine further comprising a unique identification page users are directed to when scanning the QR/bar code or manually inputting and searching a unique identification number associated with said program. The software program may also be integrated into either of a browser supported website or a mobile operating system supported application.

The present invention also discloses a multi-purpose card providing multiple commercial branding/advertisement as well as co-functionality and which includes a thin and rectangular shaped plastic body exhibiting a primary identifying brand and providing a known functionality not limited to any of a luggage tag, an electronic hotel room key card, an insurance card, a credit or debit card, or a license. A combination of a unique identification number and a corresponding QR code or bar code is imprinted upon a selected face of the body.

Instructions are imprinted upon the selected face for scanning the QR/bar code or entering the unique identification number at a site address not limited to an Internet website or a mobile application established by a secondary branded and system provider. A series of instructions are further imprinted upon the other selected face of the body for registering a portable asset using the QR/bar code and unique identification number through a software module associated with the site address.

Following termination of the primary function, the card is repurposed by a user as an asset retrieval tag and secured or tethered to the portable asset. The body exhibits a side edge proximate and slot shaped punch out aperture. An owner signature field can also be exhibited on the further selected face.

BRIEF DESCRIPTION OF THE DRAWINGS

Reference will now be made to the attached drawings, when read in combination with the following detailed description, wherein like reference numerals refer to like parts throughout the several views, and in which:

FIG. 4 is an illustration of an adhesive tag according to a further application and such as which can be applied to such as, without limitation, corporate property, mobile electronics and the like;

FIG. 8 is a succeeding contact screen display;

FIG. 9 is an administrator profile screen permitting registered users to initially enter all of their contact information a single time and which is then populated with all of previously and future entered UID tagged items;

FIG. 10 is a succeeding administrator profile screen including social media entry fields and which provides for direct links with the users UID page;

FIG. 11 is a command and control screen for managing all of the various tagged items including providing members with the option of picking and choosing contact information shown on each UID page by checking ON/OFF for each field, the UID pages being individually customized to show only the desired information for that individual UID number.

DETAILED DESCRIPTION OF THE PREFERRED EMBODIMENTS

Referring collectively to FIGS. 1-12, the present invention discloses a system, process and computer writeable medium utilizing a variety of different tags, including physical clip, loop or adhesive attachable versions, as well as a digitally downloadable version of tag. As will be described in further detail, the tags interface, such as by any combination of website or mobile application searchable unique identification number for accessing asset ownership information.

The system can also include such features as RFID (radio frequency identification) and/or GPS technology in order to assist in tracking or locating of tagged assets. The associated website (or downloadable mobile application) provides additional functionality for assisting in recovery of assets including GO TO information and the like.

Figure 1:
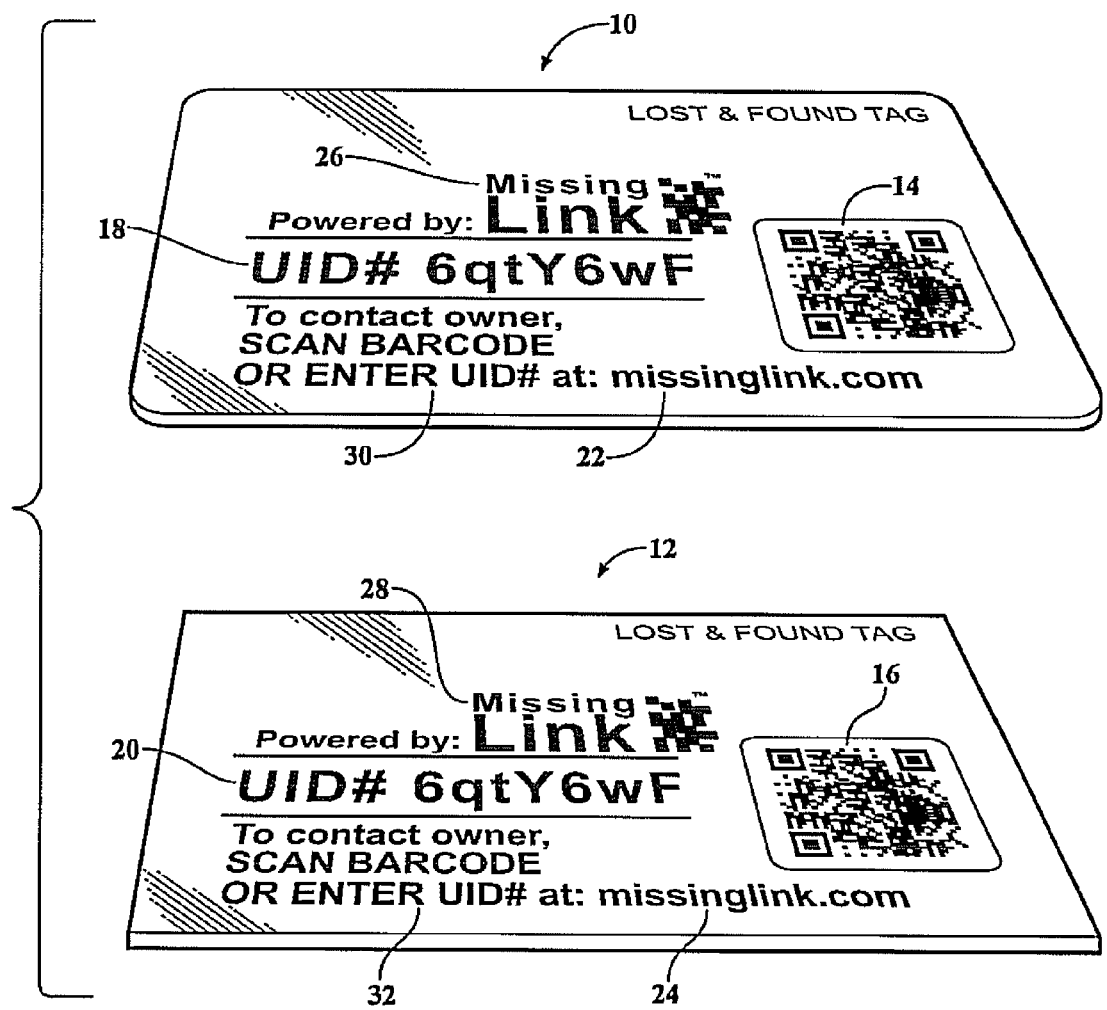
FIG. 1 is an illustration of a pair of standard series tags according to one non-limited application of the present invention and which include both QR scan code and corresponding UID unique identification number along with system provider branding and associated site contact information.

FIG. 1 is an illustration of examples 10 and 12 of standard series tags according to one non-limited application of the present invention and which each include both a QR scan code (see at 14 and 16 and which can also be represented as a standard bar-type code) such as which is easily readable by a smart phone barcode scanning program or other suitable hand held scanning device, as well as corresponding UID (unique identification) numbers 18 and 20. Also referenced is a website address 22 and 24 (www.missinglink.com) which, as will be further described, is paired to the tags and in order to perform the objectives of the present system, process and computer writeable medium.

The standard series tags 10 and 12 are further understood to be constructed, according to one non-limiting variant, of a nature which is similar to existing plastic tags (including such as a PVC plastic upon which the various information fields are electronically printed) and such as which are attached to such items as luggage, personal property (such as without limitation wallets, purses, briefcases, baggage, golf bags, etc.), and with the QR Code, UID # and website address printed thereupon. Also depicted at 26 and 28 is a system provider branding imprinted upon a front face of each card 10 and 12, with finder instructions further provided at 30 and 32 as will be described in further detail.

Figure 2:
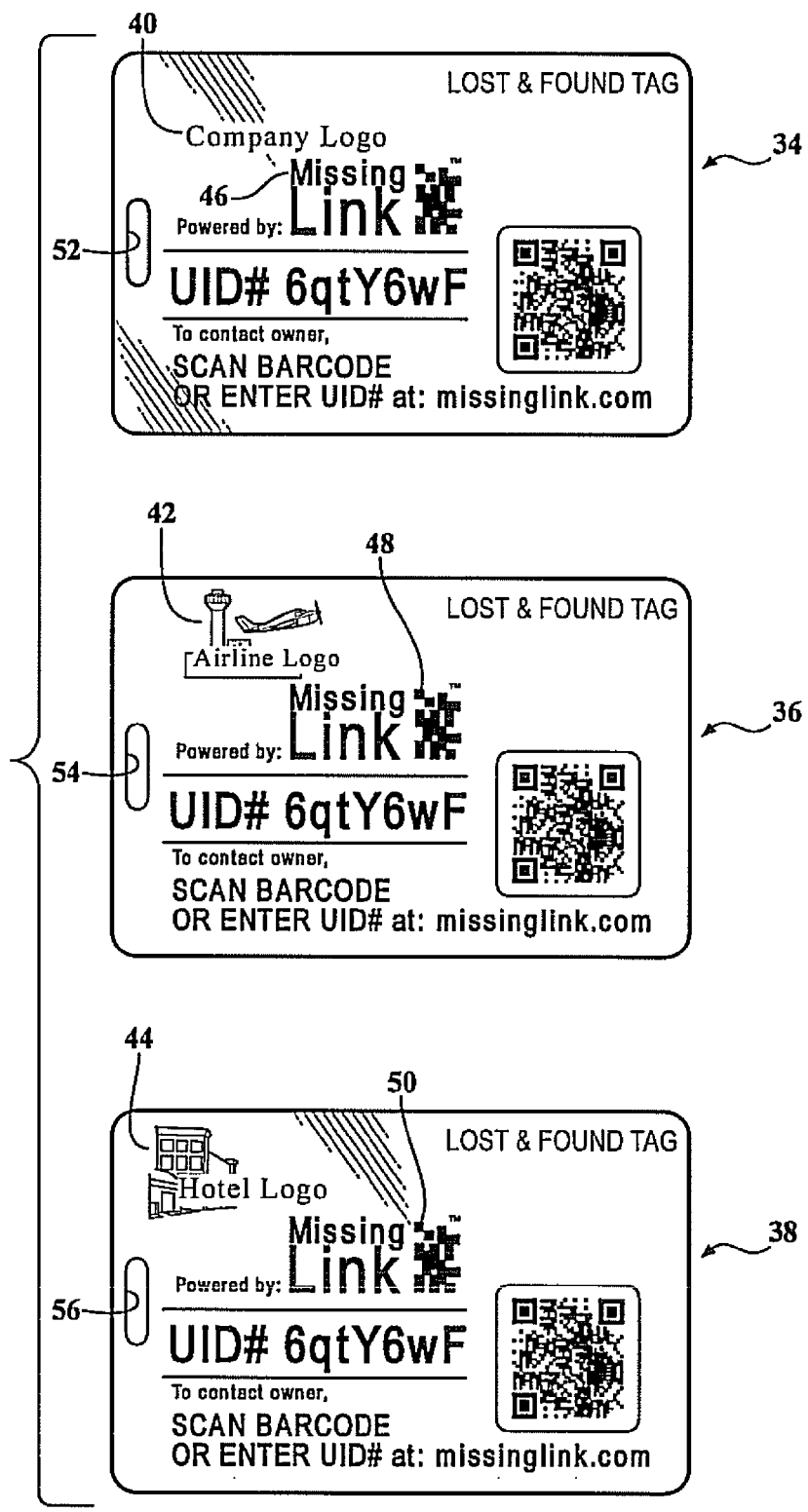
FIG. 2 is an illustration of a plurality of tags similar to those shown in FIG. 1 and which are provided in card form depicting various co-branding schemes, such as facilitating dual purpose use of the card.

FIG. 2 is an illustration of a selection of tags 34, 36 and 38 similar to those shown in FIG. 1 and which each employ a second co-branding indicia, see at 40, 42 and 44, respectively, this in addition to a system provider branding 46, 48, 50. Each of the cards otherwise exhibits a thin plastic body with a slot shaped cutout aperture (see at 52, 54, 56) located proximate an edge location thereof. The additional information fields shown at 14, 18 and 22 in FIG. 1 are repeated for each of the cards 34, 36 and 38 such that a repetitive identification is unnecessary. Specifically, the tags 18-24 are intended to represent that the system is easily adapted to incorporating a significant commercial or corporate application, such as by pairing with existing airlines, hotels or other commercial entities and in order to better track and safeguard checked luggage.

Beyond what is shown in FIG. 2, it is envisioned that the present system, process and computer writeable medium is easily adapted to numerous applications not limited to such as inventory management, personal organization, corporate (personal) property, sporting goods, mobile electronics, and the like). The durable plastic construction includes a loophole facilitating its attachment to the item to which it is tagged. Additional variants of the card not exhibiting the slot shaped punch-out or aperture (see FIG. 1) are further capable of being carried or stored within the user's wallet, purse, planner or the like in a similar manner as a credit card.

Figure 3:
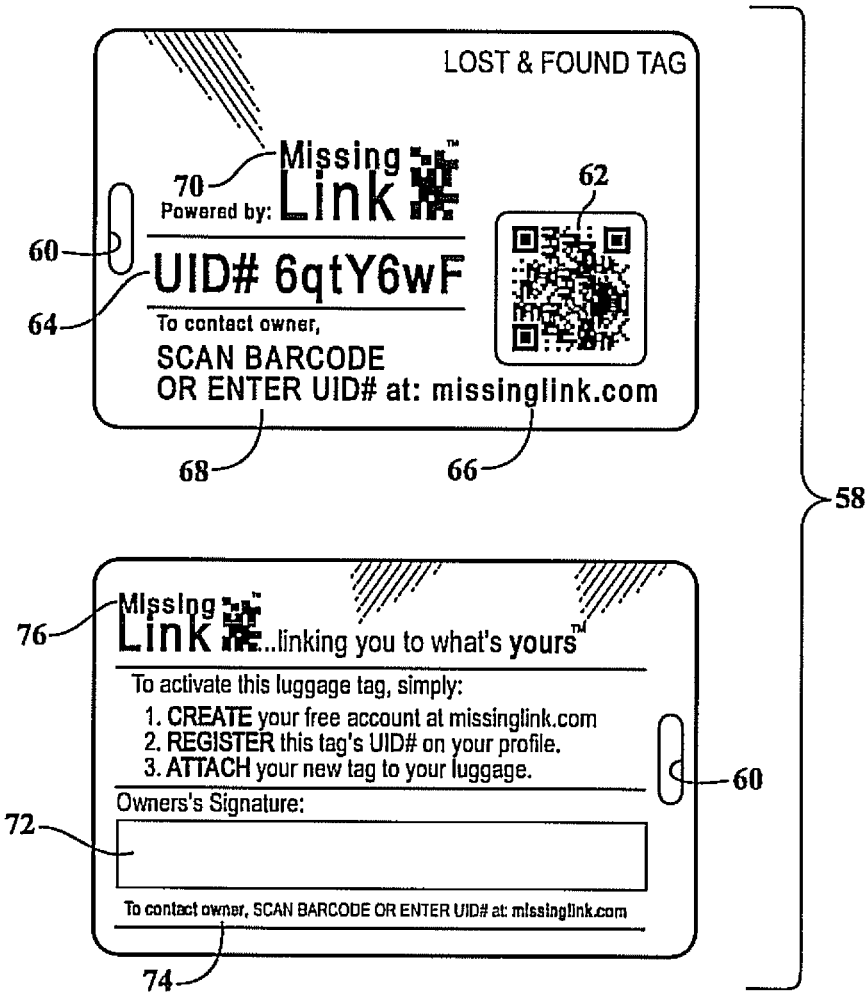
FIG. 3 depict front and back illustrations of a further tag similar to that shown in FIG. 1 and depicting a reverse side owner signature field.

FIG. 3 is an illustration of a further tag 58, which is similar to those previously depicted in FIGS. 1 and 2. The tag 58 is again provided in card form with a thin rectangular shaped plastic body and which includes a side edge proximate cutout aperture 60. Features repeated from the earlier tags include the provision of a QR code 62, paired unique identification (UID#) number 64, site address 66, contact owner information 68 and system provider branding 70, all located on a first facing side of the card. A reverse side of the card depicts an owner signature field 72 (such as associated with a luggage tag application of the card), a secondary contact owner script 74 (for instructing a finder of the tagged/lost asset), and an additional system provider branding 76.

Retaining of the owner signature field, while complementary to many of the other functions provided by the system, is still found to be desirable in many applications since a primary function of such tags is still the ability of the owner to quickly identify, by their name or signature, the identify of their property. A further advantage of using signatures on the reverse side of the tag is so that it provides adequate information in order for the owner to quickly identify his/her personal property, while at the same time not allowing a reasonable opportunity for random individuals to read who the item (such as luggage) belongs to.

Figure 4:
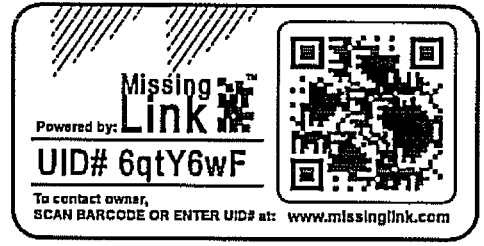

FIG. 4 is an illustration of an adhesive tag 78 according to a further application, such as which includes a similar combination of QR code, paired unique identification (UID#) number, site address identifier and optional system provider branding. The tag 78 is constructed as a foil (e.g. silver aluminum) material with an adhesive or tacky rear surface and which are effectively adhered to such as, without limitation, corporate property, mobile electronics (laptops, ebook readers, tablet computers) and the like. Given the nature of the relatively smaller sized articles to which the adhesive tags are applied, they can be commensurately sized smaller and so that they do not cover a significant surface area of the associated items.

A further class or series of tags termed digital tags are also provided in addition to the standard and adhesive tags (collectively termed as physical tags). Digital tags are provided in the form of a downloadable application that can be utilized along with any processor driven device (smart phone, laptop, tablet computer, as well as related digital photographic or related devices which incorporate sufficient microprocessor capabilities and which provide some form of visual output or display not necessarily limited to a website or downloaded mobile application). In such an application, the digital tag will be displayed upon the physical devices home page, password screen or the like. An additional feature, not limited to the use of digital tags, includes is the inclusion of GPS (global positioning system) capabilities which are enabled when the associated application is running.

FIGS. 5-12 described below collectively reference sample screen displays associated with the system site address, this generally understood to include any website or dedicated mobile application particularly accessible by a smart phone, tablet or the like, the site address operating as a hub of the service. Functionality associated with the website/mobile application includes both enabling communication (such as again via any worldwide located PC device which accesses the website/application in order to scan a QR code or manually enter a UID# of an associated tagged item which has been retrieved or located), as well as including an associated CMS style website or application which links every recorded tag to a corresponding UID page.

In this fashion, the system, process and computer writeable medium is envisioned to appeal to different user classes not limited to general audiences to whom the system and program can be advertised. Other classes of individuals include those who retrieve (or otherwise gain access to) a previously tagged item which it is desirable to determine ownership to via the QR code or UID# (exclusively within the operator website and utilizing the entry fields for presenting such QR code or UID#).

As will also be described, a URL for each UID page remains unchanged once an individual's information has been entered and saved because the URL is embedded within the QR code associated with that UID page. A further class of individuals, further described below, includes system administrators who log onto the website/application in order to register all applicable information which will show up on the UID page. From this page, such users will then enter all of their desired information one time only, such information then being automatically populated to the user profile for all previously as well as subsequently tagged items.

The site (collectively again understood to include both a browser supported website as well as any mobile device supported application) is further envisioned to provide e-commerce services (this including permitting the users to purchase digital series tags as well as both versions of physical tags). Corresponding mobile applications are envisioned to include compatibility with a number of different operating systems, not limited to Apple iOS, Google Android, as well as other competing mobile platforms not limited to those provided by each of Research in Motion (RIM/Blackberry), Palm and Microsoft/Windows. Additional to mobile applications, it is envisioned that the Digital series tags can be made to interface-able or compatible with any computer or laptop device, the goal of which is to be able to provide a tag for each processor operating device home, startup or password screen Referring now to FIGS. 5-8, collectively illustrated are a series of repetitive screen displays of a representative and non-limited version of a website homepage. Referring to the initial depiction of FIG. 5, associated fields include each of tag activation field 80, login field 82, manual search field 84 for UID number and rotating center panel display 86, such as which exhibits different images and descriptions which scroll through either participating or target industries (such as those previously enumerated) ideally suited for use of the system.

As further indicated in each alternating screen shot, a quantum of additional identifying and informative content is provided for assisting and educating the user, such including the additional regions 88, 90 and 92 corresponding to instructions for acquiring tags, creating an administrator profile, and tagging valuables. An upper located tool link bar includes each of contiguous buttons for home page 94, as well as for How it Works? 96, E-store 98, About Us 100, Contact us 102 and Follow Us on one of designated social networks generally represented at 102, 104 and 106 including such as Facebook®, Twitter®, Linked In®, and the like.

As is further previously indicated, the scrolling center panel 86 provides additional and visual advertising appealing to corporate representatives of target industries as well as any potential individual user who is perusing the site. The panel 86, according to the non-limiting representation provided, can be geared towards defining the various target markets to which the system can be advertised, such as by providing jQuery or other type of scripting.

It is further understood that the screen displays of FIGS. 5-12 represent one potential arrangement of format and functionality, and further that other website and/or mobile system application designs can be substituted for those shown. That said, and for security purposes, it is envisioned that general site access (e.g. home page access) is permitted to any visitor of the site, with specific UID# page access (as described below) being limited to only the owner of the asset or the retrieving individual who is in possession of its tag).

Figure 5:
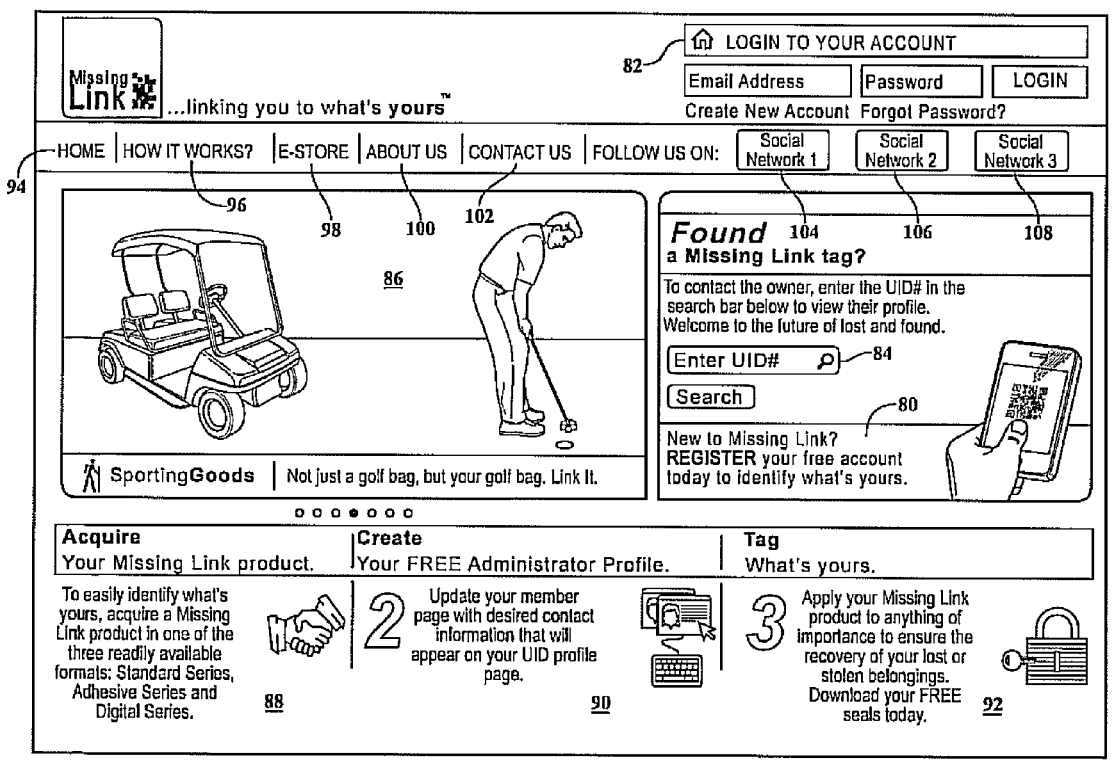
FIG. 5 is a first screen display of a site homepage incorporated into an associated software module which depicts a collection of tag activation field, login field, manual search field for UID number and rotating center panel display exhibiting different images and descriptions such as which scroll through either of participating or target industries ideally suited for use of the system.
Figure 6:
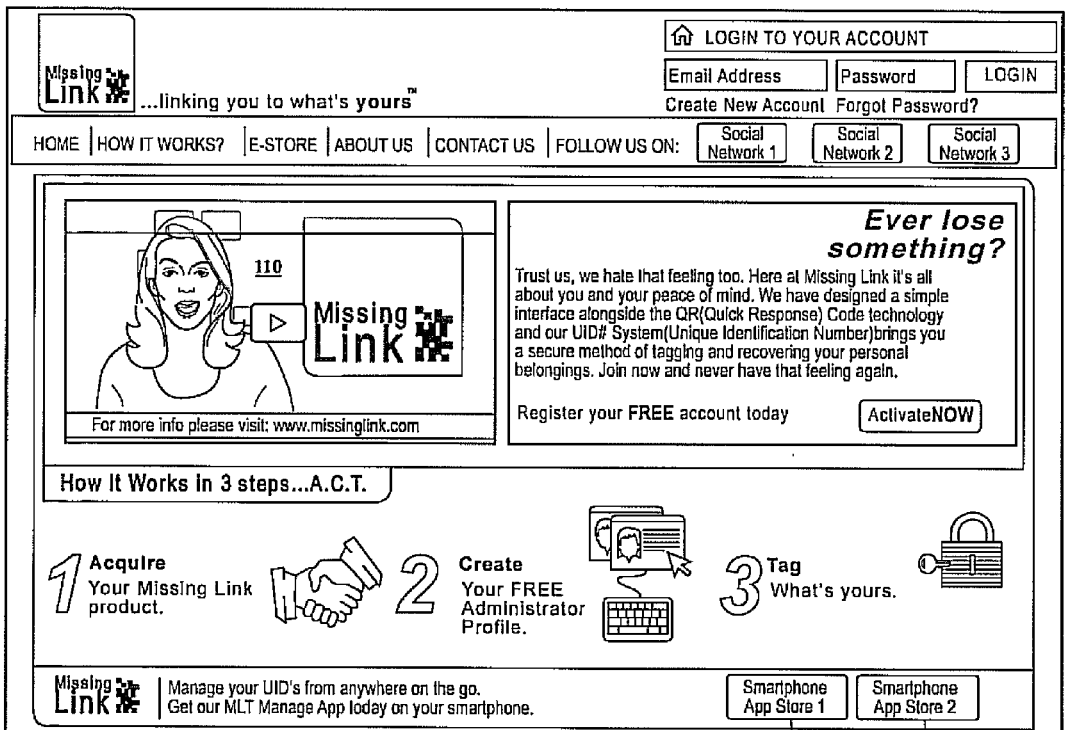
FIG. 6 is a second screen display similar to that shown in FIG. 5 and depicting additional functionality.

Referring now to FIG. 6, an explanatory screen display is depicted at 110 and including additional information relevant to the system such as an embedded video. For purposes of ease of illustration, duplicate fields identified in FIG. 5 are not repeated for each of FIGS. 6-12, with subsequent description being limited to noteworthy fields and areas notable to each succeeding illustration. In particular, FIG. 6 exhibits Smartphone App Store buttons 1 (at 112) and 2 (at 114) and which can correspond to such commercial examples as Apple iOS® and Google Play®.

Figure 7:
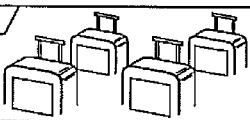
FIG. 7 is a third screen display similar to FIG. 5 and depicting other additional functionality associated with the present system.
Figure 8:
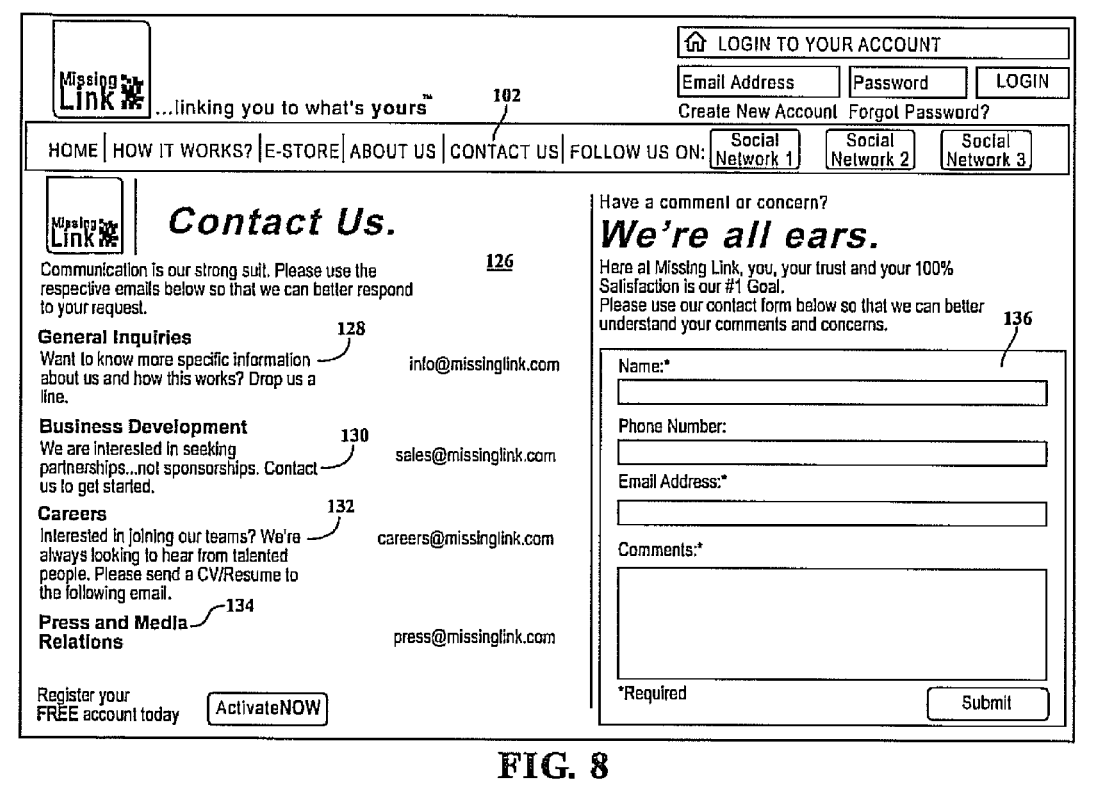

FIG. 7 complements the screen displays of FIGS. 5-6 and provide additional script 116 explaining the functionality of the system as well as application fields 118, 120, 122 and 124 pertaining to different uses associated with the present system. FIG. 8 is an illustration of a Contact Us screen 126 (see also link bar button 102) for permitting a user to request additional information (via linking areas 128-134 for each of General inquiries, Business Development, Careers, & Press and Media Relations) or to provide comments (via name, address and comment fields collectively further represented at 136).

FIG. 9 depicts an administrator profile screen permitting registered users to initially enter all of their contact information, at field 138, a single time and in a single (secured) place and which is then populated with all of previously and future entered UID tagged items. Subset fields enable entry of various biographical information as well (generally at 140), as well as social network entry fields 142. In this manner, and upon a previously registered user acquiring or activating a new tag (standard, adhesive, or digital) their previously entered contact information is automatically populated from the administrator profile to the remainder of the digital record constructed, including the UID# screens subsequently described.

As further depicted in FIG. 9, relevant entry fields include each of those for contact information (collectively at 144). A listing of currently active UID#'s is further represented at field 140 (such as itemizing various items included within the listings previously described).

Figure 10:
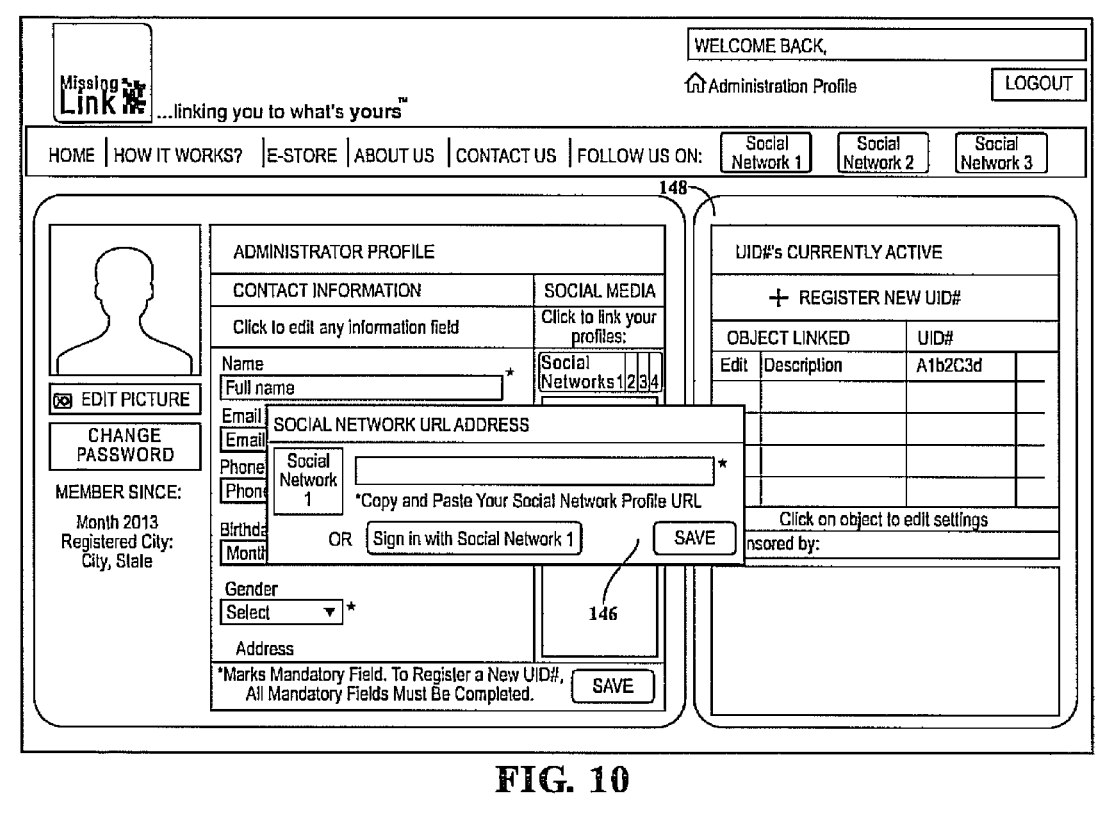

FIG. 10 is a succeeding administrator profile screen largely identical to that shown in FIG. 9 and further depicting a copy/paste pop up box 146 for entering a social network URL address or for signing in with a social network. Also depicted at 148 is a field listing each of all UID#'s currently active for the member, a new UID# registration field as well as a listing of assets/objects and paired UID#'s, and edit settings associated with the UID#'s and assets. The social media tools integrated into the system, process and writeable medium provide for direct links with the users MD page and facilitating interlinking of the program across the various social media options.

Figure 11:
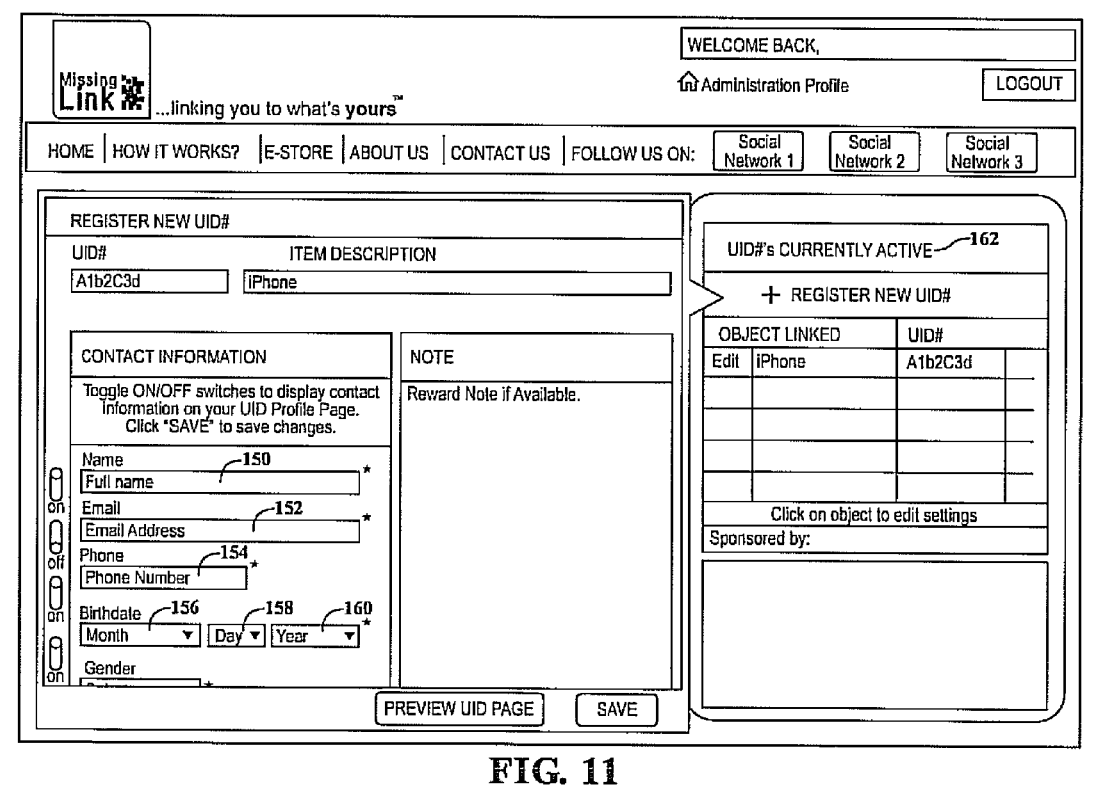

FIG. 11 is a command and control screen for managing all of the various tagged items, this including providing members with the option of picking and choosing contact information shown on each UID page (identified by a designated UID# and item description) and by checking ON/OFF for each field including name 150, email address 152, phone 154, birthdate fields 156, 158 and 160. In this fashion, the UID pages are individually customized to show only the desired information for that individual UID number (identified as A1B2C3D for iPhone) tagged within the currently active UID# field, see field 162.

Figure 12:
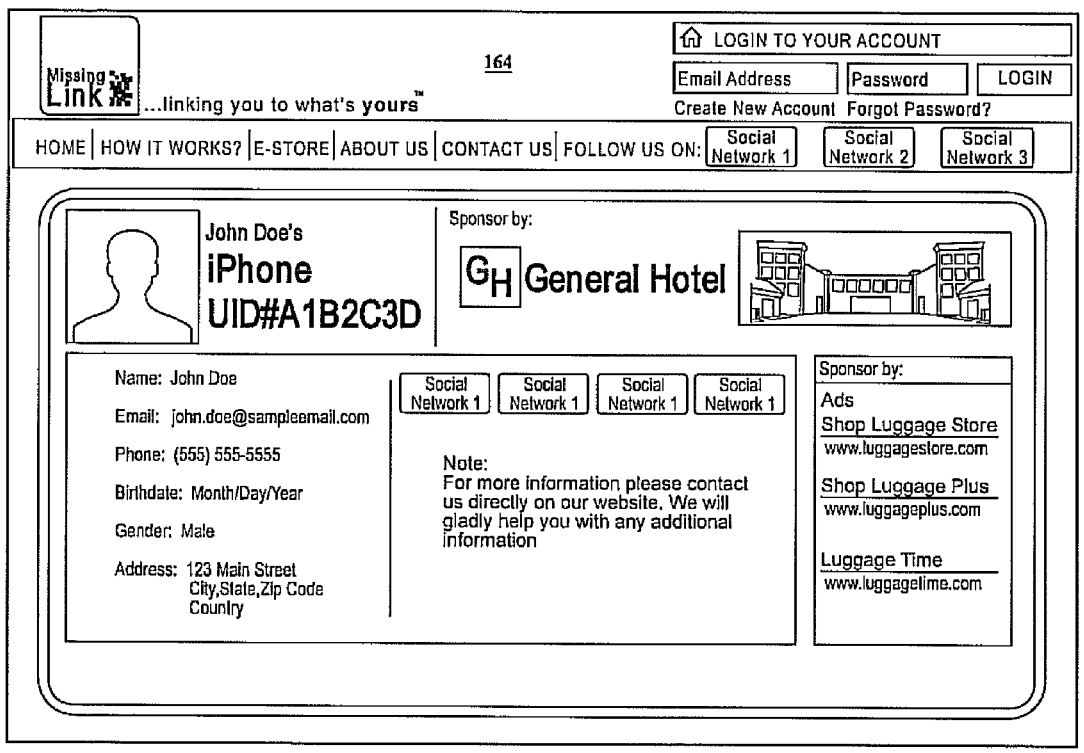
FIG. 12 is a further depiction of a page users are directed to when scanning a QR code or manually inputting and searching a UID number and which presents designated informational fields.

Finally, FIG. 12 is a UID page depiction, at 164, which users are directed to when scanning a QR code or manually inputting and searching a UM number. Specifically, users will be directed to this screen when scanning a QR code or manually searching a UID# on the site. The page is understood to begin as a generally blank slate, within which a record is constructed with the user entered information, upon which a searchable UID# is assigned, following which a QR code is generated for that UID Page's URL address.

At this point, the tag thus created is ready to be issued to a member who then registers their Administrator Profile and adds the UID# to their UID# Control Panel, thereby automatically updating what was once a blank UID page. The process is then repeated an infinite number of times with different users and members.

The present invention also discloses a computer writeable medium as provided for by the above-description of the present system and in which a plurality of physical tags and a processor integrated device exhibiting a visual display provide for for registering, tracking and identifying of a tagged physical item. A software program presents a plurality of secure user enterable fields in a first subroutine for creating a member profile.

A second subroutine of the computer writeable medium provides for registering the physical item by entering a unique identification number listed on a selected physical tag which is attached to the item, the second subroutine further pairing the item to at least one of a QR code or bar code also listed on the tag. A third subroutine enables a finder of the item to access authorized data fields drawn from the first and second subroutines, such as by either entering the unique identification number or scanning the QR/bar code, and in order to facilitate return of the lost item to its owner.

Additional features associated with the computer writeable medium include a home page which depicts a tag activation field, a login field, and a manual search field for the unique identification number. The home page may also depict a rotating center panel display exhibiting different images and descriptions such as which scroll through either of participating or target industries.

Other features include an explanatory screen display including additional information relevant to a system or protocol associated with the program. An explanatory screen describes features and benefits of an item tracking, identification and recovery system associated with the program.

Yet additional features include a Contact Us screen for permitting a user to request additional information or provide comments, an administrator profile screen permitting registered users to initially enter all of their contact information a single time and which is then populated with all of previously and future entered tagged items, as well as to interface with social media entry fields and which provides for direct links with a users unique identification number assigned item page.

A command and control screen manages all of various tagged items including providing members with the option of picking and choosing contact information shown on each page, such as by checking ON/OFF for each field, the pages being individually customized to show only the desired information for that individual unique identification number. The third subroutine further comprising a unique identification page users are directed to when scanning the QR/bar code or manually inputting and searching a unique identification number associated with said program. The software program may also be integrated into either of a browser supported website or a mobile operating system supported application.

The present invention also discloses a multi-purpose card providing multiple commercial branding/advertisement as well as co-functionality. The concept behind this feature is to offer potential commercial partners, one non-limiting example of which being hotels located worldwide hotel key cards (such exhibiting magnetic strips on their reverse faces or other integrated technology which can interface with an electro-magnetic lock associated with a hotel door), and which can also act as Missing Link luggage tags once the guest checks out.

In one application, and upon checking in, the guest is issued his/her hotel key cards as customary, but the cards are actually Missing Link luggage tags that will act as their hotel key cards during their stay. Each hotel key card will be branded with the hotel's name and will greatly enhance customer service by providing their guests with free luggage tags that are far more secure than traditional luggage tags.

The tag is typically provided as a thin and rectangular shaped plastic body exhibiting a primary identifying brand and providing a known functionality not limited to any of a luggage tag, an electronic hotel room key card, an insurance card, a credit or debit card, or a license. A combination of a unique identification number and a corresponding QR code or bar code is imprinted upon a selected face of the body.

Instructions are imprinted upon the selected face for scanning the QR/bar code or entering the unique identification number at a site address not limited to an Internet website or a mobile application established by a secondary branded and system provider. A series of instructions are further imprinted upon the other selected face of the body for registering a portable asset using the QR/bar code and unique identification number through a software module associated with the site address. These steps to assist in registering/activating the luggage tags can include, in one non-limiting application, presenting an indicia scheme such as which reads "To activate these tags, simply: 1. CREATE your free account at missinglink.com 2. REGISTER the tag's UID# on your profile. 3. ATTACH your new tags to your luggage." Additional indicia notifying a finder of the previously tagged item can also include the verbiage "To Contact Owner, SCAN BARCODE OR ENTER UID# at: missinglink.com".

Following termination of the primary function, the card is repurposed by a user as an asset retrieval tag employing the above disclosed protocol and according to the teachings of the system, method and computer writeable medium previously described, following which the card/tag is secured or tethered to the portable asset. The thin walled and card shaped body can exhibit a side edge proximate and slot shaped punch out aperture (such as for receiving a lanyard). An owner signature field can also be exhibited on the further selected face.

As previously described, the commercial or other co-branding applications associated with the present tags, system, method and computer writeable medium are not limited to what is described above and can potentially also be applied to (or integrated along with) any number of existing products such as insurance cards, licenses, other membership cards, existing luggage tags provided by major airlines or the like.

Additional variants can also include dropping the QR code feature in favor of any suitable identifying indicia paired to the unique identification number, and such as including any other kind of electronically scannable input paired to the UID#, as well as the ability to substitute any other potential marking or identifying indicia for that shown or described.

Another variant of the present system, method and computer writeable medium envisions reconfiguring any version of physical or adhesive tag for applying to a pet collar or the like and which includes associated software protocol and functionality for facilitating the short term care and return of lost pets. Such a pet-finder variant can also extend to include any version of physical tag which may include co-branding options consistent with those described herein (such as in association with pet care commercial providers) and can include system provider features enabling simultaneous or repurposing use of the tag, this further including in one non-limiting instance combining the system provider aspects along with a local city or township issued dog registration tag or the like.

Having described my invention, other and additional preferred embodiments will become apparent to those skilled in the art to which it pertains, and without deviating from the scope of the appended claims.

We claim:

1. An asset registering and tracking system, comprising: any plurality of tags physically attached to or digitally encoded in association with a physical item; at least one of said tags exhibiting at least one of a QR code or bar code, along with a separate unique identification number printed thereon, said tag also identifying a site address accessible by a member user and associated with said system; a software program incorporated into a processor integrated device used to access said site address and exhibiting a visual display, said program including a first plurality of secure user enterable fields for creating a member profile as well as identification information associated with the physical item paired to a selected tag associated with a record populated to that profile, said program further including additional fields for member entry of information associated with said tag in order to establish ownership with information derived from said member profile, said program further including providing members with the option of picking and choosing contact information in selected fields by checking ON/OFF for each field such that they are individually customized to show only the desired information for that individual unique identification number; and upon the item being lost and subsequently found, the finder entering the unique identification number or scanning the QR/bar code in order to uncover at least one additional data field which draws information from said member entered fields in order to facilitate return of the lost item.

2. The system as described in claim 1, said tag further comprising a thin and rectangular shaped body exhibiting an edge proximate slot shaped aperture, an owner signature field being exhibited on a reverse side of said body.

3. The system as described in claim 1, further comprising a tacky/adhesive attachable tag.

4. The system as described in claim 1, further comprising any plurality of digitally encoded tags which are displayed upon any of a website/application home, password or security screen.

5. The system as described in claim 1, further comprising a GPS function associated with the processor integrated device being activated concurrent with accessing said program.

6. The system as described in claim 1, the software program further comprising any of a browser supported website or a mobile operating system supported application.

7. A non-transitory computer writeable medium for use with a plurality of physical tags and a processor integrated device exhibiting a visual display for registering, tracking and identifying a physical item, comprising: a software program presenting a plurality of secure user enterable fields in a first subroutine for creating a member profile; a second subroutine for registering the physical item by entering a unique identification number listed on a selected physical tag which is attached to the item, said second subroutine further pairing the item to at least one of a QR code or bar code also listed on the tag; a third subroutine for enabling a finder of the item to access authorized data fields drawn from said first and second subroutines by either entering the unique identification number or scanning the QR/bar code, and in order to facilitate return of the lost item to its owner; and a command and control screen for managing all of various tagged items including providing members with the option of picking and choosing contact information shown on each page by checking ON/OFF for each field, the pages being individually customized to show only the desired information for that individual unique identification number.

8. The non-transitory computer writeable medium of claim 7, further comprising a software program home page which depicts a tag activation field, a login field, and a manual search field for the unique identification number.

9. The non-transitory computer writeable medium of claim 7, further comprising an explanatory screen display including additional information relevant to a system or protocol associated with said program.

10. The non-transitory computer writeable medium of claim 7, further comprising an explanatory screen describing the features and benefits of an item tracking, identification and recovery system associated with said program.

11. The non-transitory computer writeable medium of claim 7, further comprising an explanatory screen describing the features and benefits of an item tracking, identification and recovery system associated with said program.

12. The non-transitory computer writeable medium of claim 7, further comprising a Contact Us screen for permitting a user to request additional information or provide comments.

13. The non-transitory computer writeable medium of claim 7, further comprising an administrator profile screen permitting registered users to initially enter all of their contact information a single time and which is then populated with all of previously and future entered tagged items.

14. The non-transitory computer writeable medium of claim 13, said administrator profile screen further comprising social media entry fields and which provides for direct links with a users unique identification number assigned item page.

15. The non-transitory computer writeable medium of claim 7, said third subroutine further comprising a unique identification page users are directed to when scanning a QR/bar code or manually inputting and searching a unique identification number associated with said program.

16. The non-transitory computer writeable medium of claim 7, said software program further comprising either of a browser supported website or a mobile operating system supported application.

17. A multi-purpose card, comprising: a thin and rectangular shaped plastic body provided by a commercial entity with which a user has contracted, said body exhibiting a primary identifying brand and providing a known functionality not limited to any of a luggage tag, an electronic hotel room key card, an insurance card, a credit or debit card, or a license, said known functionality including a customized feature provided by the commercial entity; a combination of a unique identification number and a corresponding QR code or bar code imprinted upon a selected face of said body; instructions imprinted upon said selected face for scanning said QR/bar code or entering said unique identification number at a site address not limited to an Internet website or a mobile application established by a secondary branded and system provider; and a series of instructions imprinted upon the other selected face of said body for registering a portable asset using the QR/bar code and unique identification number through a software module associated with said site address; following termination of said primary function, said card being repurposed by the user as an asset retrieval tag and secured or tethered to the portable asset.

18. The card as described in claim 17, said body further comprising a side edge proximate and slot shaped punch out aperture.

19. The card as described in claim 17, said body further comprising an owner signature field being exhibited on the further selected face.

* * * * *